United States Patent
Tran (10) Patent No.: US 12,232,222 B2
(45) Date of Patent: Feb. 18, 2025

(54) GATEWAY FOR USE IN WIRELESS COMMUNICATION

(71) Applicant: Vinh Quang Tran, Hanoi (VN)

(72) Inventor: Vinh Quang Tran, Hanoi (VN)

(73) Assignee: HANOI UNIVERSITY OF SCIENCE AND TEC, Ha Noi (VN)

( * ) Notice: Subject to any disclaimer, the term of this patent is extended or adjusted under 35 U.S.C. 154(b) by 449 days.

(21) Appl. No.: 17/837,277

(22) Filed: Jun. 10, 2022

(65) Prior Publication Data

US 2022/0312552 A1 Sep. 29, 2022

(51) Int. Cl.
*H04W 88/16* (2009.01)
*H04L 1/00* (2006.01)
*H04L 45/74* (2022.01)

(52) U.S. Cl.
CPC .......... *H04W 88/16* (2013.01); *H04L 1/0061* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 10,560,562 B1* | 2/2020 | Tandon | H01Q 21/28 |
| 2018/0234970 A1* | 8/2018 | Hall | H04W 72/0453 |
| 2018/0352536 A1* | 12/2018 | Hall | H04B 1/7156 |
| 2020/0068390 A1* | 2/2020 | Knapp | H04W 12/04 |
| 2021/0149803 A1* | 5/2021 | Bernat | G06F 3/061 |
| 2021/0337355 A1* | 10/2021 | Sobol | H04W 4/023 |
| 2023/0325171 A1* | 10/2023 | Chapuis | B61L 23/042 717/172 |

OTHER PUBLICATIONS

Erturk M. A, Aydin M. A, Buyukakkaslar M. T, Evirgen H. A Survey on LoRaWAN Architecture, Protocol and Technologies. Future Internet. Oct. 17, 2019; pp. 1-34. (Year: 2019).*

* cited by examiner

*Primary Examiner* — Lonnie V Sweet (57) ABSTRACT

The present invention relates to a gateway for use in wireless communication. The gateway according to the present invention is to wireless communicate with nodes and a server. The nodes and the gateway communicating with each other via an improved LoRaWAN protocol for extending further functions for the gateway, such as data processing or the same, result in computing requirements decreased at the server, reducing in time and several communicating procedures among network components, thus enhancing the efficiency for using network resources.

6 Claims, 10 Drawing Sheets

GATEWAY FOR USE IN WIRELESS COMMUNICATION

TECHNICAL FIELD

The present invention relates to a gateway for use in wireless communication and, more particularly, to a gateway for use in wireless communication using an improved LoRaWAN protocol to enhance efficiency in communication and in using network resources. The present invention also relates to a communication method and a system that uses the gateway.

BACKGROUND

As prior knowledge, LoRa is a wireless technology developed to be transmittable data via a long distance with relatively low energy consumption, which is spreadly used in IoT (Internet of Thing) applications, capable to maintain the connectivity and operation of nodes within a long duration while only using energy from battery.

A LoRa network is capable to provide a network coverage similar to that of a mobile network. Thus, the LoRa technology is considered to be advantageous for use in various different applications, including: intelligent quantification, inventory tracking, vending machine data monitoring, automobile industry, utility applications, and in any field which requires data report and control.

Furthermore, LoRaWAN (Long Range Wireless Area Network) is developed as a systematic structure and a communication protocol in a LoRa-based network, wherein LoRaWAN provides strict rules in the network protocol and architecture, are factors which have a significant impact for energy saving to increase lifetime of nodes, while still ensure network capacity, service quality, security level, and various different applications are served by the network.

Figure 7:
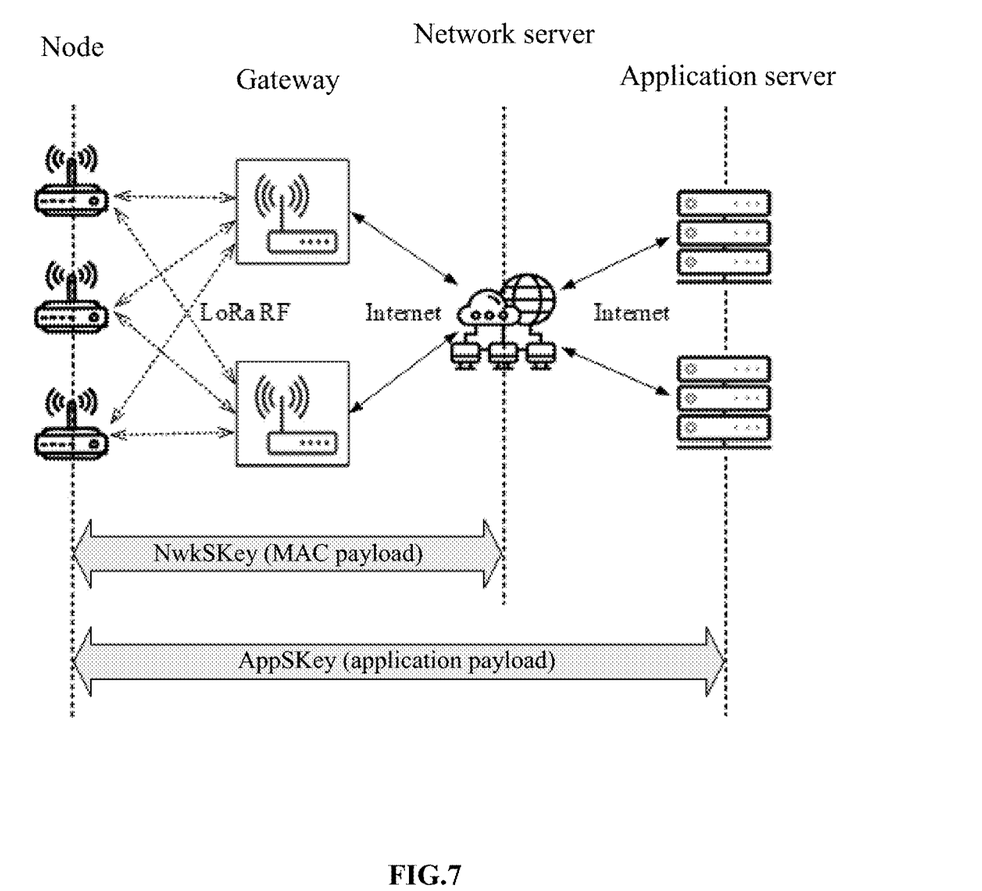
FIG. 7 is a flowchart that illustrates the communication operations of the main components in the network of a communication system based on a typical LoRaWAN protocol.

In general, as shown in FIG. 7, the structure of LoRaWAN includes four main components as described hereafter.

Nodes: including one or more devices equipped with sensor, to encode collected data into data packets (or may be called as messages), then sending to a gateway.

Gateway: taking a role as an intermediate device used to make a connection between nodes and a server. In practical communication applications, a gateway may receive a plurality of data packets from different nodes, the gateway is to make arrangement of received data packets, then forwarding/relaying them to the server for processing at the server.

Server: or may be called as network server, is a control center, managing data packets. Because a system may often have a plurality of gateways, these gateways may receive duplicate packets sent from nodes, or there may be delay in receiving packets, not simultaneously. Therefore, the server may be configured to wait for packets to be sufficiently received, then compare to remove the duplicate packets, and finally decoding the packets into data type which users require.

Application servers: may be a website server or a mobile application server, or any device which allows one to run a certain application where information of the related data are displayed for user.

In the structure of LoRaWAN above, nodes are to communicate with gateway by a method of multiple access, is called as ALOHA protocol. Thus, nodes will not to connect with a specific gateway, but wherein messages from each node will be broadcasted to all gateways, and turning to gateways they will forwarding all messages which gateways have received to server. Therefore, there will be a vast of duplicate messages sent to server that makes the server and gateway performance are significantly reduced due to they have to spend a part of resource for modulating, demodulating and processing those duplicate messages, the network bandwidth is wasted as well to transmit the duplicate messages.

In addition, as for the LoRaWAN protocol, the server currently handles quite a lot of tasks, such as: OTAA (Over-The-Air-Activation), removing duplicate data packets, routing for messages, response speed control, acknowledgement of messages, etc. This may cause the server to be overload, slow down the response and may degrade in operating performance during certain periods of time.

Furthermore, in the typical structure of LoRaWAN, the network registration processes and the sending messages are encoded. Nodes using network section key (Network Section Key—NwkSKey, used for MAC data load) and application section key (Application Section Key—AppSKey, used for application data load), according to the AES-128 encryption standard, for encoding message from node sending to the server and the application server. All messages are decoded on the network server and be processed at the server. So, the gateway in the mentioned structure of the above LoRaWAN does not know encryption keys and totally operates as a relaying station. That is, in the structure of LoRaWAN, the rules are not provided to define the gateways to include functionalities of processing and calculating tasks, even though they are equipped with favorable processors, capable to satisfy highly calculating requirements.

As such, in the typical structure of LoRaWAN itself, there remain two problems, that is to remove the duplicate packets at the network server and to provide additional rules in the network structure so that gateway(s) may be capable of calculation to operate as a role which may undertake at least a part of calculating, processing tasks in the network, result in decreasing the requirements at the network server and increasing the efficiency of the network.

In several applications which use LoRaWAN, such as a technical solution in a patent publication document No. U.S. Ser. No. 10/567,495 B2. As disclosed in this document, when nodes send their data packets to a gateway, gateways may not directly forward said data packets to network server; instead of that, the gateway may send the data packets via another gateway, called as a primary gateway which forwards the data packets to the server. This results not only in time and forwarding hop number increased in the whole network, but also generating network procedures between the gateways to identify which among the gateways become the primary gateway for a group of its relative gateways. In addition, the relationship between a node and a gateway is not a one-to-one relationship, so that if there is a certain node that is unable to communicate with a gateway, said gateway may understand that said node may communicate with other gateways or devices while the node may actually not to communicate with any gateway at all. This may lead to a situation in which the operating status of nodes may be not updated fully, or may be difficult to access node information in several specific scenarios.

In other different applications which use LoRaWAN, such as technical solutions in Chinese publication documents No. CN 110891330 A and No. CN 209692795 U. As disclosed in these documents, the gateways are mentioned as devices which are capable to support edge computing, that is intended to carry out some processing and computing tasks at the gateway. However, those documents do not provide clearly instructions or explanations or modifications of the structure of LoRaWAN, this means that the gateways are deemed not to know encryption keys related to encoding data sent from nodes via the LoRaWAN, this leads to processing, computing tasks at the gateway are significantly limited and difficult to carry out some processing, computing tasks over data which require to 'understand' what the data content being, due to the gateway is unable to decode encoding data packets and may not distinguish the content of data included a packet or among different packets that have sent from the nodes via LoRaWAN.

Therefore, it is necessary to improve the structure of LoRaWAN applied to the wireless communication network to further enhancing the efficiency in communication and use network resources.

SUMMARY

An object of the present invention is to provide a gateway for use in wireless communication, may overcome one or more of the above-mentioned problems.

An other object of the present invention is to provide a gateway for use in wireless communication, may favorably remove duplicate data packets and minimize the number of messages used in a network.

Yet another object of the present invention is to provide a gateway for use in wireless communication, using an improving LoRaWAN-based structure, which may result in the gateway favorably carry out processing, computing tasks, such that processing requirements for the server may reduce.

Still, another object of the present invention is to provide a method and a system for wireless communication using the above mentioned gateway, capable to favorably customize and expand a network, and may remove communicating procedures among gateways.

Various objects to be achieved by the present invention are not limited to the aforementioned objects, and those skilled in the art to which the disclosure pertains may clearly understand other objects from the following descriptions.

To achieve one or more above objects, according to an aspect, the present invention provides a gateway for use in wireless communication, wherein the gateway comprising:

a server communication unit; a node communication unit; and a control unit; wherein:

the server communication unit for communicating with the server;

the node communication unit for communicating with at least one node via a protocol having a LoRaWAN-based communication protocol, the node communication unit receives a data packet provided and encoded by the node, wherein the data packet includes data collected by the node, wherein the data packet has a LoRaWAN-based structure including a modified physical payload section and four information fields according to the LoRaWAN communicating protocol which are a preamble, a physical header, a physical header CRC, and a CRC inserted into the data packet automatically, wherein the physical payload section includes a medium access control layer header subsection and a medium access control layer payload subsection, characterized in that:

the medium access control layer header subsection includes a message type information for indicating a type of a data packet, the medium access control layer payload subsection includes a frame header subfield, wherein the frame header subfield contains a device address information which includes a node address of the node that generates data packets and a gateway address of the gateway to which said node communicates, and a frame control information which includes an acknowledgement information and a portion for reserved for future usage for customizing a frame controlling;

the control unit is configured for controlling the gateway to:

only communicate with the server(s) and the nodes without communicate with other different gateways within a same network, receive a data packet sent from node if said data packet includes a gateway address information which is specified in the device address information above identical with a gateway address information of the gateway, generate and send an acknowledgement information to said node after the gateway has received said data packet, decode said data packet sent from said node for obtaining data collected by the node, and process said data at the gateway for obtaining a processed data, and send the processed data to the server via the server communication unit.

According to an embodiment, said data processing at the gateway includes, without a limitation of, data gathering, carrying out edge computing algorithms, carrying out AI (Artificial Intelligence) algorithms, or the same.

Alternatively, the gateway server communication unit communicates with the server via WiFi, Ethernet, 4G LTE, radio, wired communication, wireless communication, or any of their combination.

According to an embodiment, the message type information is 3 bits in length and indicates types of the data packet including a join-request message, a join-accept message, an unconfirmed data message, a confirmed data message, an unconfirmed command message, a confirmed command message, based on the values of the bits.

According to an embodiment, the device address information is 4 bytes in length, 2 bytes for indicating the node address and 2 bytes for indicating the gateway address.

According to an embodiment, the acknowledgement information is 1 bit long.

BRIEF DESCRIPTION OF THE DRAWINGS

FIGS. 6A to 6F are top view, bottom view, front view, left view, and right view illustrating a gateway for use in wireless communication according to an exemplarity embodiment provided on a printed circuit board.

DESCRIPTION OF EMBODIMENTS

Hereinafter, advantages, efficiencies, and inventive concepts of the present invention shall be understood more clearly through the detailed description of the preferred embodiments with reference to the accompanying drawings. However, it is understood that those preferred embodiments are mainly intended for illustrating and descriptive purposes for a person skilled in the art to which the present disclosure pertains, to fully understand the inventive concepts and the advantages of the present invention without any limitation the scope of the present invention to the following described embodiments.

In general, the present invention intends to improve the structure of LoRaWAN applied in a wireless communication network for further enhancing efficiency in communications and efficiency in using network resources. Several essential features and inventive concepts of the present invention shall be understood more clearly through explanations or descriptions of a method and a system for wireless communication hereafter.

Figure 1:
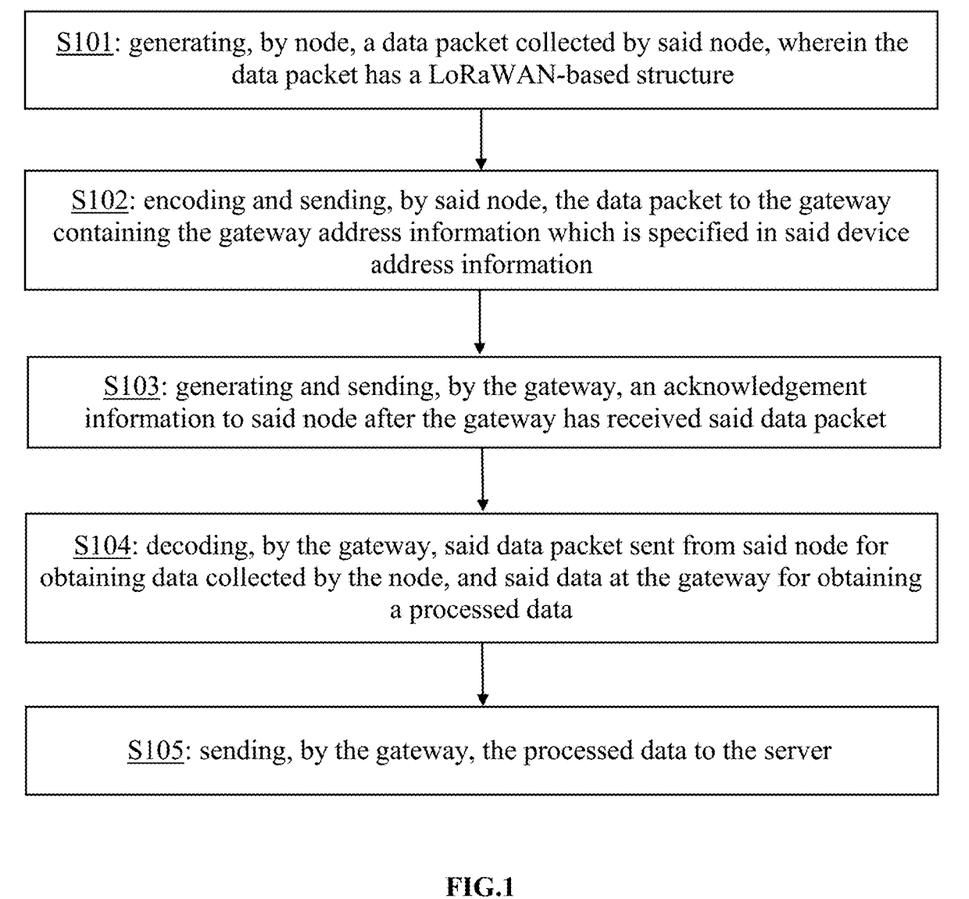
FIG. 1 is a flowchart that illustrates a method for wireless communication according to a preferred embodiment of the present invention.

As shown in FIG. 1, method for wireless communication (s) according to a preferred embodiment of the present invention, comprising the steps from step S101 to step S105 as described in details as below.

Step S101: generating, by a node, a data packet collected by said node, wherein the data packet has a LoRaWAN-based structure.

In this step, the data packet has the LoRaWAN-based structure which includes a modified physical payload section and four information fields according to the LoRaWAN communicating protocol which are a preamble, a physical header, a physical header CRC, and a CRC inserted into the data packet automatically.

The physical payload section includes a medium access control layer header subsection and a medium access control layer payload subsection. The medium access control layer header subsection includes a message type information for indicating a type of a data packet. The medium access control layer payload subsection includes a frame header subfield, wherein the frame header subfield includes a device address information which includes a node address of a node generating a data packet and a gateway address of the gateway to which the node generating the data packet communicates, and the frame control information includes an acknowledgement information and a portion for reserved for future usage for customizing a frame controlling. Further details of the data packet structure will be described hereafter with a reference to FIG. 3.

It should be understood that the term "section/subsection" used in the entire of the present disclosure, such as "header section/subsection", for example, is intended for use to encompass or be equivalent to fields or subfields of layers, sublayers or any component in the structure of the data packet.

Step S102: encoding and sending, by said node, the data packet to the gateway which has a gateway address information which is specified in the device address information. Preferably, the gateway communicates only with the server (s) and nodes without communicate with other different gateways within the same network, to be capable to remove the communicating procedures between the gateways.

Step S103: Generate and sending, by the gateway, an acknowledgement information to said node after the gateway has received the said data packet.

Step S104: decoding, by the gateway, said data packet sent from said node to obtain data collected by the node, and said data at the gateway to obtain a processed data.

It is obviously to person skilled in the art that, the gateway according to the preferred embodiment must be known encryption keys related to the encoding data sent from nodes. For example, the gateway has known the network section key (Network Section Key—NwkSKey), the gateway may be known the application section key (Application Section Key—AppSKey), or the gateway may be known the network section key and the application section key, due to practical applications wherein the gateway is required to perform one or more processing tasks, instead of these tasks are performed by a network server, an application server, or both the network server and the application server.

Step S105: sending, by the gateway, the processed data to the server. Thus, the server may be not necessarily to process the processed data again, or only providing some further certain tasks over the processed data. As the result, there may reduce processing requirements for the server.

It is conspicuous that, by the manner to clearly define addresses of the nodes and the gateway(s) in the structure of a data packet, the relationship between the node and the gateway is the one-to-one relationship. Beside facilitating access and update the status of the node, the gateway may easily recognize to ignore data packets which are not assigned to be sent to said gateway, result in reducing several processing tasks, such as the processing task to identify a data packet, for example.

The gateway may be availably equipped with components for performing computing tasks, thus by clearly defining for the gateway to undertake a part of computing, processing tasks in the network may result in requirements reducing at the network server and significantly increasing the efficiency of using the networks resources.

According to several embodiments, the data processing tasks at the gateway may include, without a limitation of, data gathering, carrying out edge computing algorithms, performing AI algorithms (Artificial Intelligence), or the same.

It is conspicuous that, by processing data at the gateway according to the embodiments, the capacity of data sent from the nodes shall be significantly reduced before sending to the server. Such as in the case there are a plurality of data to be sent to the gateway, which are inputting data of an AI prediction model for example, instead of forwarding all the inputting data to the server for processing similar to typical solutions, the gateway according to the present invention may only send the data of predicted results given by the AI prediction model to the server. This may result in favorably increasing the efficiency of using the network bandwidth.

In general, the gateway may communicate with the server via any known communicating techniques, for example WiFi, Ethernet, 4G LTE, radio, wired communication, wireless communication, or any of their combination.

According to a preferred embodiment, if the server needs to send commands to the nodes, the server may send command messages to a gateway, and the gateway will send the command messages that contain the content of the commands to the node(s). Preferably, the command message may be sent accompanying with an acknowledgement message. After receiving the command message, the corresponding node will send an acknowledgement message related to the received command sent to the node, to the gateway.

Figure 2:
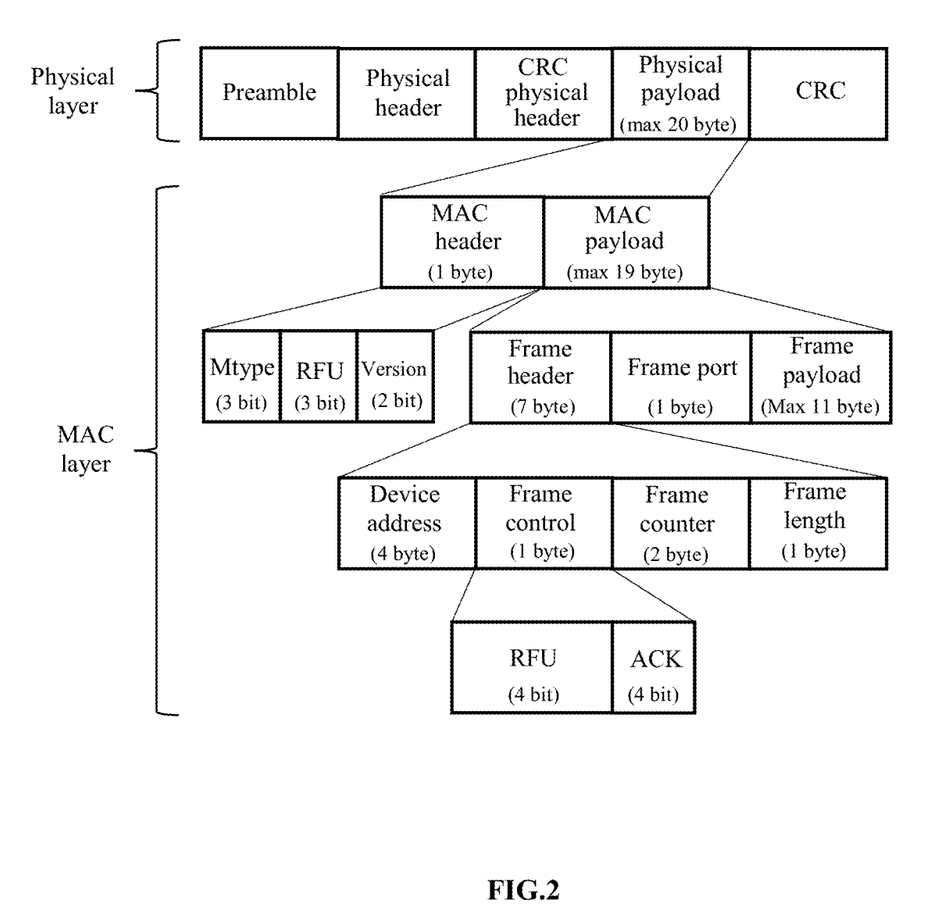
FIG. 2 illustrates the structure of a data packet according to a preferred embodiment of the present invention.

FIG. 2 illustrates the structure of a data packet that is improved based on the LoRaWAN protocol according to an example embodiment of the present invention.

According to the exemplary embodiment, the data packet has a physical layer which includes a modified physical payload section and four information fields according to the LoRaWAN communication protocol, which are a preamble, a physical header, a physical header CRC, and a CRC inserted into the data packet automatically. The physical payload section has its length is maximum to 20 bytes. The fields of the preamble, the physical header, the physical header CRC, and the CRC have lengths and characteristics similar to those defined by the LoRaWAN.

The physical payload section includes a MAC (Medium Access Control) header subsection which is 1 byte in length, and a MAC payload subsection which is maximum to 19 bytes in length.

The MAC header subsection includes subfields which are message type (message type—Mtype) is 3 bits in length for indicating the type of the message or the data packet (see Table 1), this is optional that the length of 3 bits are used for reserving for the future usage (Reserved for Future Usage—RFU), and the length of 2 bits are used for containing the version of the protocol which is employed.

TABLE 1

List of the data packet according to the values of bits of Mtype

| Mtype | Type of the data packet |
|---|---|
| 000 | join-request message, sent from the nodes |
| 000 | join-accept message, sent from the gateway |
| 010 | unconfirmed data message, send from the nodes |
| 011 | confirmed data message, sent from the nodes |
| 100 | unconfirmed command message, sent from the gateway |
| 101 | confirmed command message, sent from the gateway |
| 110 | reserved for the future usage |
| 111 | reserved for the future usage |

The MAC payload subsection includes a frame header subfield which is 7 bytes in length, an optional subfield (such as RFU) which is 1 byte in length, and a frame payload subfield which is maximum to 11 bytes in length for containing data of the frame.

The frame header subfield includes a device address part which is 4 bytes in length (2 bytes for indicating a node address and 2 bytes for indicating a gateway address), a frame control part which is 1 byte in length containing the protocol control information, a frame counter part which is 2 bytes in length for indicating the order number of the data packet, and a frame length part which is 1 byte in length for indicating the length of a payload which is contained in the frame.

The frame control part includes an acknowledgement subpart (ACK), which is 4 bits in length and an optional subpart (or RFU), which is 4 bits in length.

Figure 3:
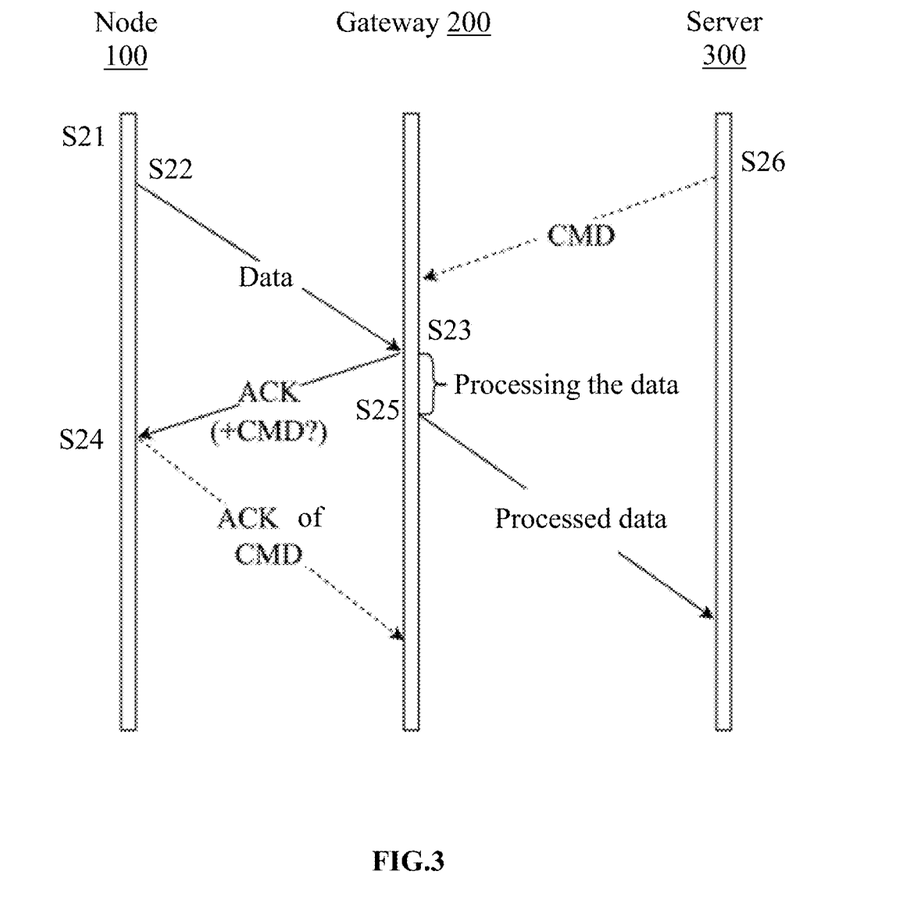
FIG. 3 is a flowchart that illustrates the communication operations of the main components of the network of the system for wireless communication according to a preferred embodiment of the present invention.

FIG. 3 is a flow diagram illustrating the communication operations of the main components in the network of the system for wireless communication according to a preferred embodiment of the present invention.

A wireless communication according to the preferred embodiment includes the main components of a node 100, a gateway 200, and a server 300.

It should be understood that 'node' and "gateway" are referred to throughout the present disclosure substantially as representative. That is, although it can only describe or illustrate/refer to 'node(s)' (or one node), "gateway(s)" (or one gateway) or the relationship between the node and the gateway. However, the present invention is not limited to any particular number of nodes and the gateway. The system for wireless communication according to the present invention may include one or more nodes, one or more gateways, and the number of them is not of any limitation, such as the number of the nodes may be up to 50 or 100, or greater, for example.

Similarly, the server may be used to represent a server system and related components of the server system.

According to the preferred embodiment, node 100 is configured to perform at least functions according to the steps of Steps S21, S22, and S24 as described in detail below.

Step S21: generating a data packet which contains data collected by the node 100, wherein the data packet has a LoRaWAN-based structure includes a modified physical payload section and four information fields according to the LoRaWAN communicating protocol which are a preamble, a physical header, a physical header CRC, and a CRC inserted into the data packet automatically.

Similar to above descriptions, the physical payload section includes a medium access control layer header subsection (MHDR—MAC Header) and a medium access control layer payload subsection. The medium access control layer header subsection includes a message type information for indicating a type of a data packet. The medium access control layer payload subsection includes a frame header subfield, wherein the frame header subfield includes a device address information which includes a node address of the node generating the data packet and a gateway address of the gateway to which the node generating the data packet communicates, and the frame control information includes an acknowledgement information and a portion for reserved for the future usage for customizing a frame controlling.

Step S22: encoding and sending the data packet to the gateway 200 which has the gateway address information which is specified in the device address information above.

Step S24: node 100 sends and acknowledgement (ACK) for the data packet to the gateway 200 after node 100 is received the data packet containing a command (CMD) sent from the server 300 (Step S26) via gateway 200.

Still according to the preferred embodiment, the gateway 200 only communicates with the server 300 and the node 100 without communicating with other different gateways within the same network, the gateway 200 is configured to perform at least functions according to the steps of step S23, and S25, as described in details as below.

Step S23 generates and send an acknowledgement information to node 100 after the gateway 200 received the data packet.

As a subsequent step, the gateway 200 decodes the data packet sent from node 100 to gathering the data collected by node 100, and processing said data at the gateway to obtain processed data.

It is inherently that the gateway according to the preferred embodiment must be known encryption keys related to the data sent from nodes. The processing task at the gateway 200 may include, without a limitation of, data gathering, carrying out edge computing algorithms, performing AI algorithms (Artificial Intelligence), or the same.

It is conspicuous that the processing task on Gateway 200 may be installed, changed, or supplemented based upon the applications and requirements in reality.

Step S25: sending the processed data to the server 300.

According to a preferred embodiment, if server 300 needs to send a command to node (s) 100, the server will send a message containing the command (CMD) to the gateway 200 (Step S26), and the gateway 200 will send the message with the command(s) to the node(s) 100 (Step S23), respectively.

As shown in FIG. 3, the message containing the command may be sent accompanying with an acknowledgement message. After receiving the command message, the corresponding node 100 will send an acknowledgement message related to the command sent to the node, to the gateway 200, and the node 100 will perform the task(s) in the command that the node has received.

Due to the data processing task being performed at the gateway 200, the acknowledgement message related to the command sent from the server 300 only needs to be sent to the gateway 200 without forwarding to the server.

In general, the node 100, gateway 200, the server 300, the structure of the data packet, and other components in the network are substantially similar to each other for using in a method for wireless communication or a system for wireless communication according to the present invention. Characteristics are described for the method for wireless communication according to the present invention (the method) are completely suitable to apply for a system for wireless communication according to the present invention (the system) and vice versa. Therefore, some details descriptions which have been described while disclosing the method may intend to be omitted while disclosing the system, and vice versa. However, it should be understood that the system or method according to the present invention may encompass all the characteristics which are disclosed regardless of whether related contents are disclosed accompanying the system or the method according to the present invention.

In general, gateway 200 may be provided similar to typical gateways that are known and using in the LoRaWAN network.

Gateway 200 may include a feeding energy source using a battery equipped with a converter, a central processing unit (CPU), sensors, a storage, RAM, ROM, a LoRaWAN communicating member.

According to an exemplarily embodiment, the CPU may use a type of CPU named AM5728, including a LoRa SPI (Serial Peripheral Interface) port communicating with the LoRaWAN communicating member via a LoRa PCIe (Peripheral Component Interconnect Express) slot. However, the present invention is not limited thereto.

According to a preferred embodiment, the gateway 200 may be equipped with additional functions, such as the functions for gathering data related to the operation of the gateway itself, the environment surrounding the gateway, or gathering additional data according to a certain requirement which may not be processed and/or be communicated independent from the LoRaWAN.

Gateway 200 may have components for connecting to Ethernet, WiFi, ZigBee, USB port, HDMI port, V2X port, or the same component.

It is conspicuous that the gateway for use in wireless communication according to the present invention may have an important role in enhancing efficiency in communications and efficiency in using the network resources. In addition to functions and characteristics/features are described above, the present invention also provides details manufacturing characteristics for the gateway as described as below.

As for a convenience, at first, a functional block diagram of the gateway for use in wireless communication according to a preferred embodiment will be described in details hereafter with reference of FIG. 5.

Figure 5:
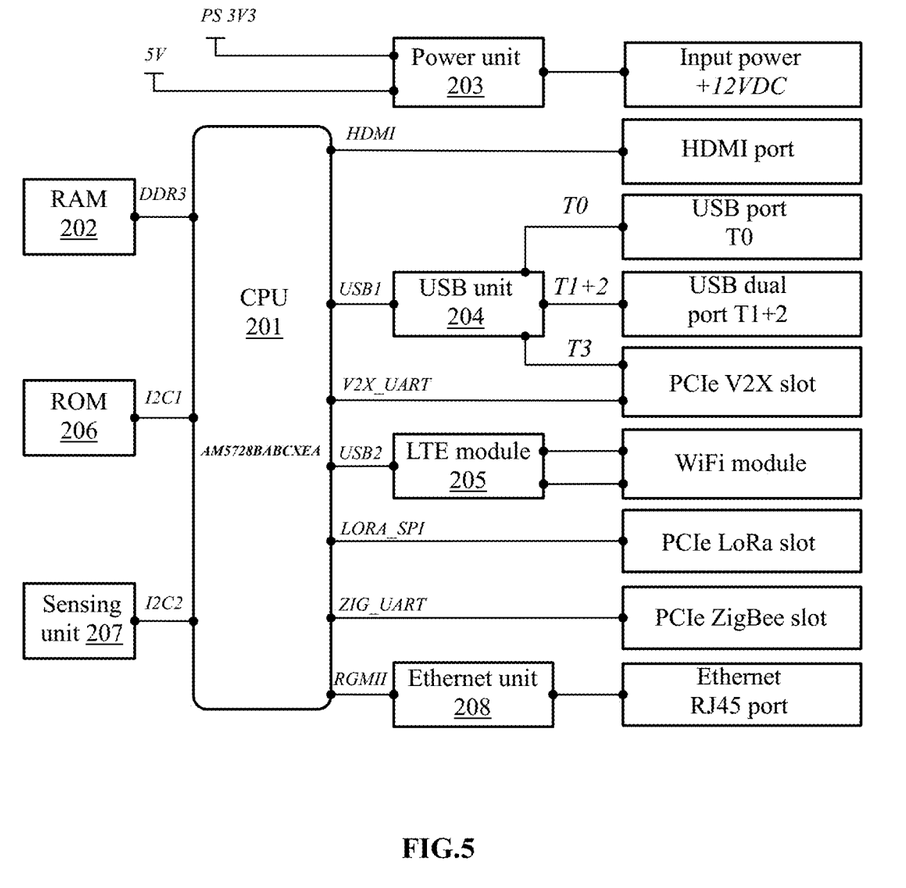
FIG. 5 is a functional block diagram illustrating a gateway for use in wireless communication according to a preferred embodiment of the present invention.

As shown in FIG. 5, the gateway according to the present invention includes a central processing unit 201, a power unit 203, a RAM 202, a ROM 206, a LTE module 205, an USB unit 204, an Ethernet unit 208, and SPI (Serial Peripheral Interface) connecting interfaces, an UART (Universal Asynchronous Receiver/Transmitter), a HDMI (High-Definition Multimedia Interface). The SPI connecting interfaces for connecting to a LoRa module via a PCIe LoRa slot (is illustrated as LoRa SPI in the drawing). The LoRa module according to the preferred embodiment takes a role as the node communication unit of the gateway.

Herein, the control unit of the gateway according to the present invention includes a central processing unit 201. However, the control unit is not limited to any configuration, the control unit may further include or may not include additional components except the central processing unit 201, as long as the control unit is capable to carry out controlling functions of the gateway.

The central processing unit 201 connects to the LTE module 205 via an USB connecting interface (illustrated as USB2 in the drawing). A WiFi module is connected with the LTE module 205 to take a role as the server communication unit of the gateway.

To supply power for the operation of the gateway, the power unit 203 may be equipped with suitable converter(s), such as an electric converter, a booster, a buck, for supplying suitable power, such as a DC 12V power for example.

The RAM 202 is connected to the central processing unit 201 via a DDR3 connecting interface. The ROM 206 is connected to the central processing unit 201 via an I2C (Inter-Integrated Circuit) connecting interface, illustrated as I2C1 in the drawing. A sensor unit 207 is connected to the central processing unit 201 via an I2C connecting interface, illustrated as I2C2 in the drawing.

The USB unit 204 is connected to the central processing unit 201 via an USB connecting interface (illustrated as USB1 in the drawing). The USB unit 204 may include four USB ports from T0 to T3.

The Ethernet unit 208 is connected to the central processing unit 201 via a RGMII connecting interface. The Ethernet unit 208 may include one, two, or more than two Ethernet RJ45 ports.

It is conspicuous that, by additionally equipping the HDMI port, the USB ports from T0 to T2, the gateway according to the present invention may be expanded the capability for connecting and accessing data with most of common electronic devices, so that it is capable to expand the customized capability following practical design requirements.

According to an exemplarily embodiment, the gateway according to the present invention may be favorably applied in wireless communication networks used for managing and monitoring automated car/vehicle parking stations. As for a convenience, a PCIe V2X (Vehicle to Everything) slot may be provided availably to provide a communicating channel use for car(s), vehicle(s), or the same. The PCIe V2X slot is connected to the central processing unit 201 via the USB connecting interface (T3 port) and the UART (illustrated as V2X UART in the drawing). However, the present invention is not limited thereto.

According to an other embodiment of the present invention, the gateway according to the present invention may be applied in IoT environmental monitoring and supervising systems in the aquaculture, or in the smart farming. Each region/area to be monitored or supervised will be installed sensing devices (nodes) to record, measure, and sense the variation of the environmental parameters. The sensing data from the nodes will be packed into data packets according to the improving LoRaWAN as mentioned in FIG. 2. The data packets will be sent by the nodes, to the gateway according to the flowchart illustrated in FIG. 3. The gateway according to the present invention may use a LoRa communicating port or a Zigbee port to communicate with the nodes. The gateway according to the present invention may use the Ethernet port, the LTE or the WiFi to communicate to the server. By using the structure of the data packet and the manner of communication following the improving LoRaWAN as provided by the present invention, the gateway according to the present invention may decode messages received from the nodes, carrying out AI algorithms, or edge computing algorithms, for removing duplicate messages, synthetizing data before sending to the server. The gateway according to the present invention may also receive configuration messages and command (CMD) messages from the server to forward to the nodes. The configuration and CMD message are used to set up the configuration and control the operating mode of sensors, executive components, and operating modes of the nodes, for example sensing modes, measurement method, the frequency for sending messages, selecting the methods of radio communication. A flowchart for receiving the data packet from the nodes, data processing, sending data packets from the gateway to the server, receiving and sending the configuration messages and the CMD messages of the gateway are illustrated in FIG. 4 and will be described in details hereafter.

Figure 4:
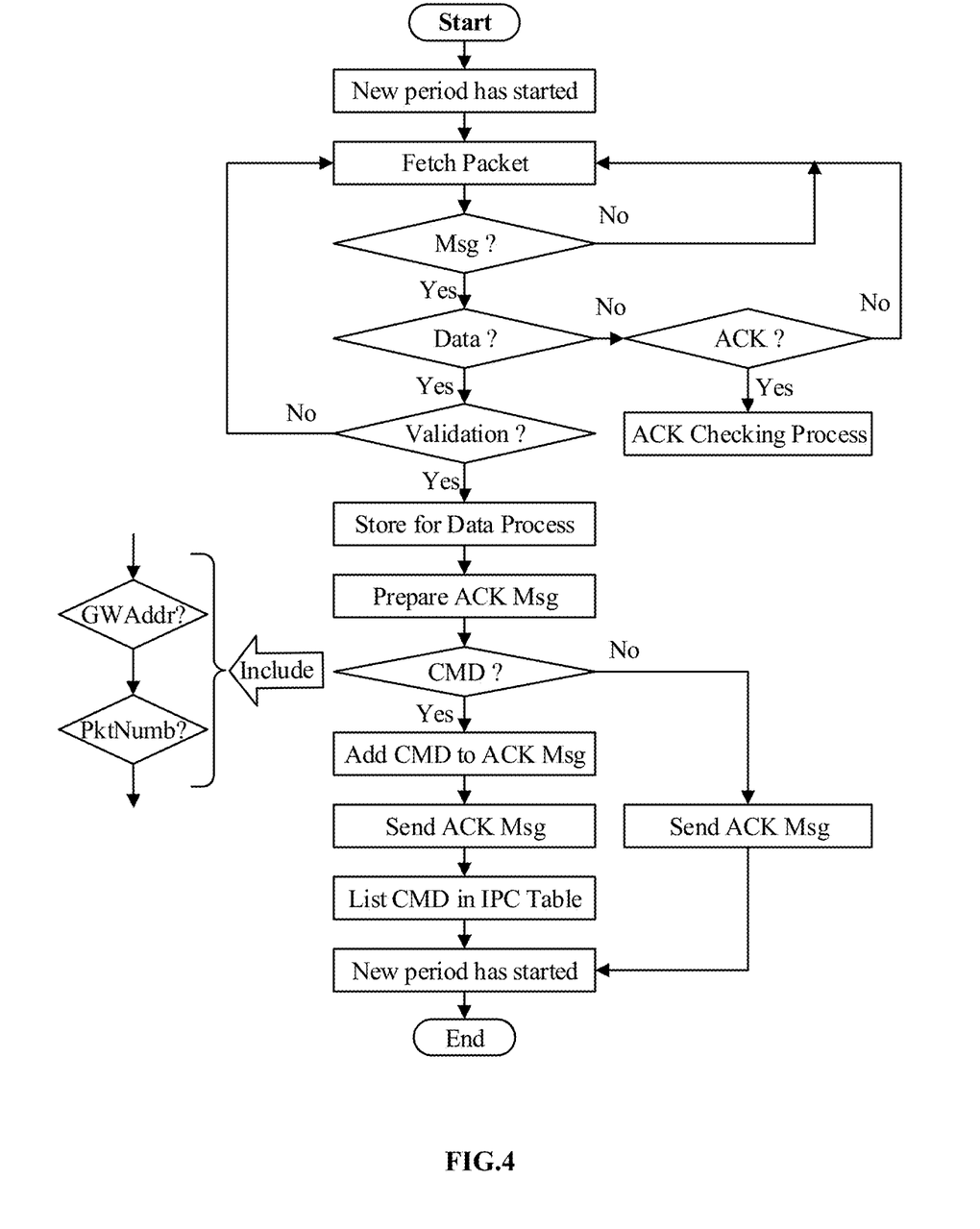
FIG. 4 a flowchart for the data receiving, processing, and sending algorithm of the gateway according to a preferred embodiment of the present invention.

As shown in FIG. 4, after starting up, the gateway initializes a new operating cycle/a new period, and reads messages/fetch packets from a buffer storage. If the reading step is unsuccessful (the reading result is "NO"), the gateway will turn back to the reading step to read the messages from the buffer storage until the reading step is successful (the reading result is "YES").

Next, the gateway identifies whether the read message (Msg) is a data packet or not? If "Msg" is NO, the message will continue for checking whether it is an acknowledgement (ACK) message or not? If ACK is NO, it will be turned back to the reading step to read messages from the buffer storage, if ACK is YES, it will carry out the ACK message.

After the gateway identifies the read message is a data packet, the identifying step will be confirmed that is validation or not, if the validation is NO, it will be turned back to the reading step to read messages from the buffer storage, if the validation is YES, the gateway will store and carry out to process the data packet, and prepare an ACK message.

Next, the gateway identifies whether there is a CMD message needed to forward or not? If YES, the gateway will add the command of the CMD message into an ACK message, send the ACK message, list the command CMD into an IPC table, and initialize a new operating cycle. If NO, the gateway will send an ACK message and initialize a new operating cycle.

According to the preferred embodiment, the command CMD may include the address of the gateway (GWAddr) and the order number of the data packet (PktNumb).

Finally, after initializing a new operating cycle, the gateway will finish the previous operating cycle and repeating the steps as described above.

For reserving or expanding further additional functions of data collection of the gateway according to the present invention, a ZigBee PCIe slot may be provided, the ZigBee PCIe slot is connected to the central processing unit 201 via an UART connecting interface (illustrated as ZIG UART in the drawing), for assembling a ZigBee module whenever it is needed.

As illustrated in the drawings, the central processing unit 201 is a micro processor which is available, AM5728BABCXEA. However, other equivalent processors may be used as well.

Next, referring to FIGS. 6A to 6F, a manufacturing method of a reality gateway according to the present invention will be give as an exemplarily embodiment.

As shown in FIGS. form 6A to 6F, the gateway according to the present invention is constructed on a printed circuit board with electronic elements layouts are provided on both two surface of the printed circuit board to compact the size of the gateway.

In general, the electronic elements layouts on the printed circuit board having a significant important role it the designing and manufacturing process of the hardware of the gateway, this highly impact to the stable operation, maximum performance of the device. Designing layouts for arranging the electronic elements on the printed circuit board of the gateway according to an exemplarily embodiment may need a balancing combination between rules in designing, connections between the elements, layout appearance must be clear, the size must be suitable. These requirements may correspond to many aspects, such as selecting material to make the printed circuit board, designing rules for functional unit (a power unit, a control unit, a signal transceiving unit, for example), a layout rule of power sourcing lines, a layout rule of signal lines, a layout rule of differential signal lines, a layout rule of the length of lines of signal lines in a same group of signals, and the same rules.

Figure 6A:
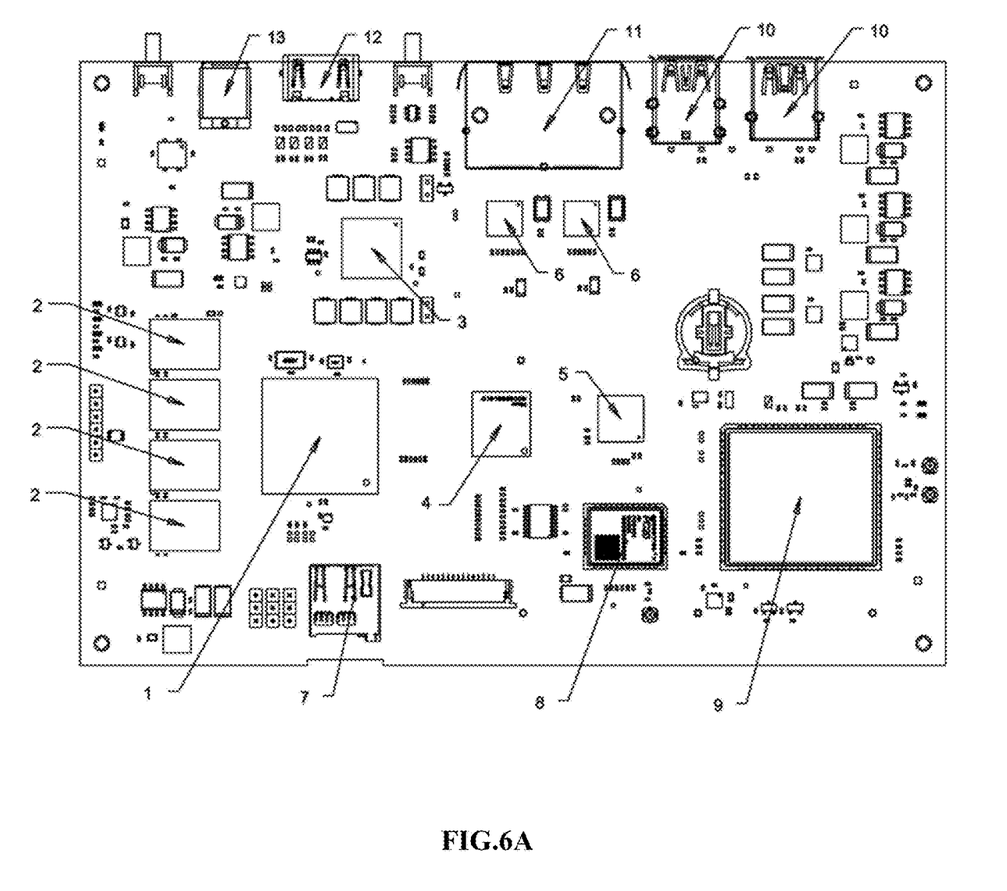

As shown in FIG. 6A, the top surface of the printed circuit board including components which are a central processing unit 1 (AM5728), a RAM 2 (4 GB DRAM), a power unit 3 (TPS6590376), a flash 4 (IC Flash 32 Gbit), an USB unit 5 (TUSB8041), an Ethernet unit 6 (IC transceiver Full 4/4 48 QFN), a SD card 7, a WiFi module 8, a 4G module 9, USB 3.0 ports 10, Ethernet RJ45 ports 11, a HDMI port 12, and a DC port 13.

Figure 6B:
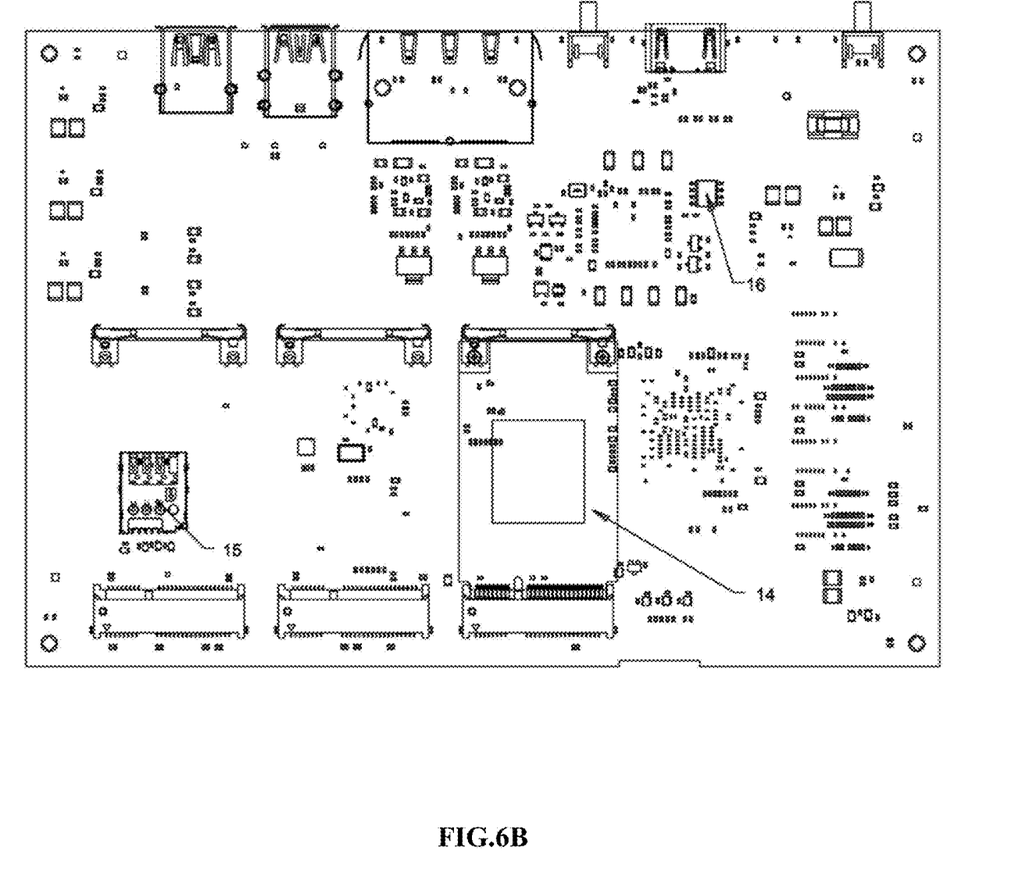
Figure 6C:
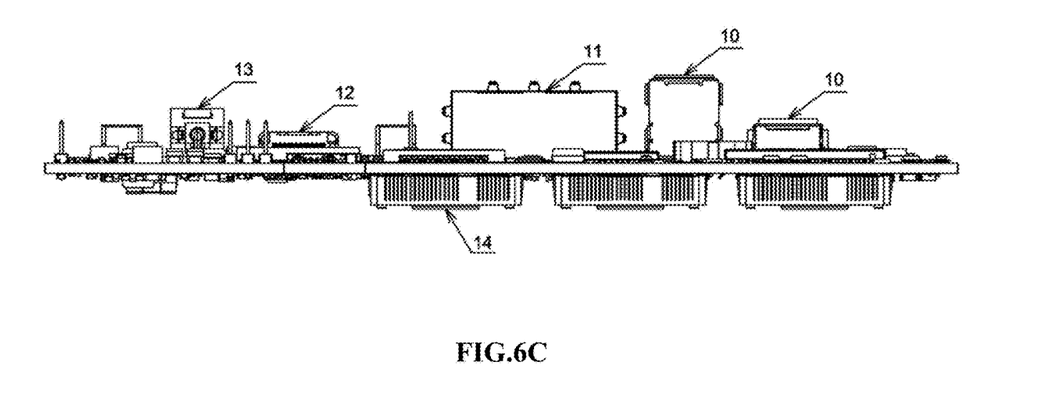
Figure 6D:
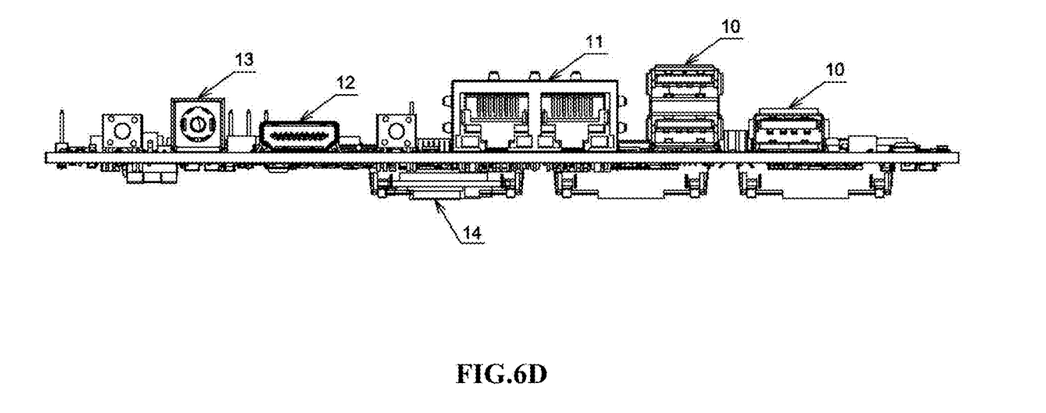
Figure 6E:
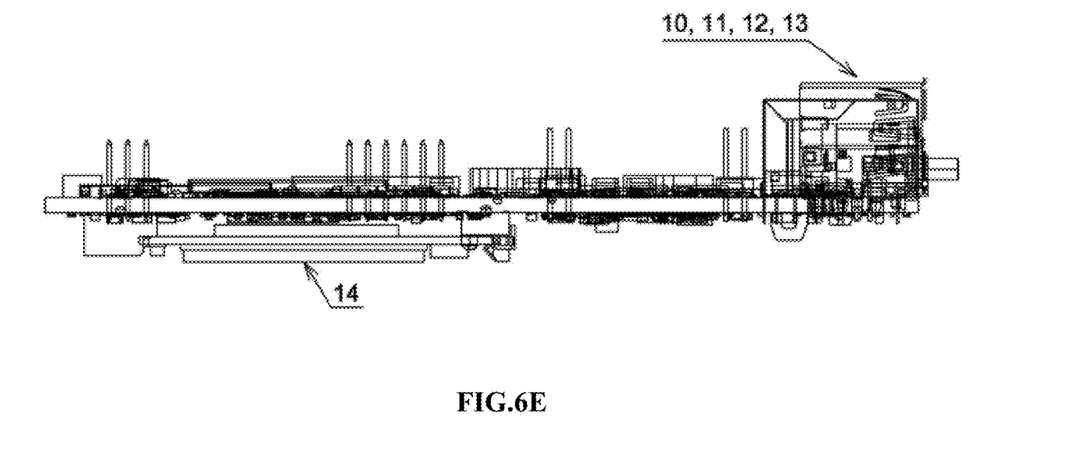
Figure 6F:
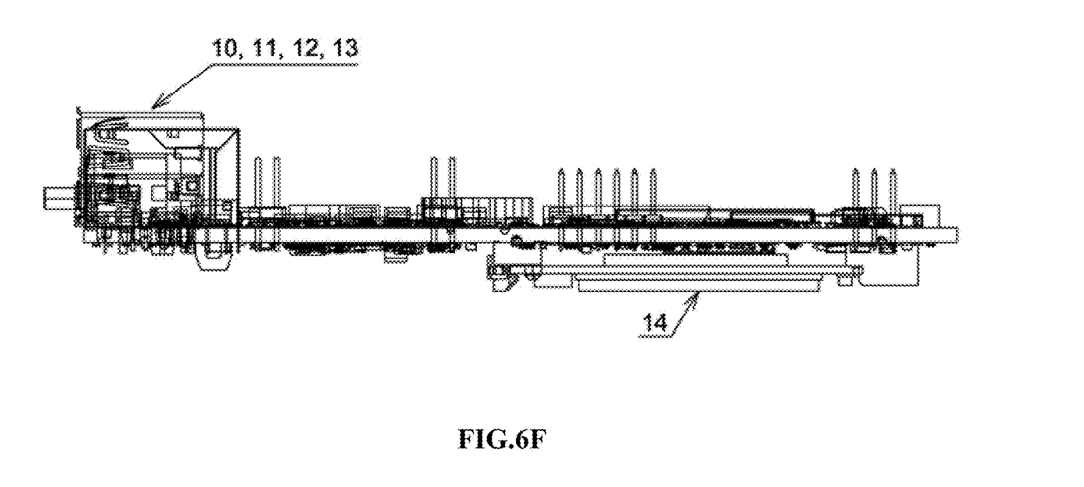

As shown in FIG. 6B, the under surface of the printed circuit board including components which are a LoRa module 14, a SIM card 15, and a ROM 16. On the under surface of the printed circuit board there further includes two reserved PCIe slot are arranged close to the PCIe LoRa slot of the LoRa module 14, two reserved PCIe slot may be used for a Zigbee module, a V2X module, or the same.

As shown in FIGS. 6C to 6F, the USB 3.0 port 10 from T0 to T2, the Ethernet RJ45 ports 11, the HDMI port 12, and the DC port 13, are arranged closely to each other and having the same plugging-in direction at one edge of the printed circuit board. The PCIe slots are arranged parallel and in the same direction to facilitate for user operations. These arrangements may facilitate for assembling/installing, operating and arranging the gateway in practical.

Preferably, the gateway may be provided with a gateway housing to contain and protect the printed circuit board inside, the gateway housing may be provided with any shape and material. However, the gateway may no need to have the gateway housing, for example if the gateway is provided on one printed circuit board and placed in a suitable cabinet of network devices, the gateway housing may be omitted in this case.

According to a preferred embodiment of the present invention, a storage means may be provided to store a computer program which includes computer instructions when executed will make the computer to implement the method for wireless communication described above.

Accompanying with features as described above, the present invention may satisfy to apply in various different applications, these applications may belong to various different technical fields, such as automated car/vehicle parking stations managing and supervising, vending machine data monitoring, inventory tracking, automobile industry, utility applications and in any field which requires data report and control, for example.

Due to each certain application and requirement, the nodes, the gateway, and the server may be provided to be suitable. For example, an application for managing and supervising an intelligent car/vehicle parking slots in urban city areas, the nodes may be used in a plurality in number and be equipped with types of sensors for identifying the status of empty/occupied of parking slots in the urban city areas. In applications for monitoring and supervising environments, the gateway may be integrated into a monitoring station. The gateways may have fewer in number and represent for a certain geographical region, such as a group of wards/communes, districts. The server may represent for a relative large geographical region which may include the certain geographical regions of the gateways, for example.

Although some embodiments have been described herein. It should be understood that obvious modifications, equivalent arrangements, or variations could be made based on the described embodiments by an ordinary skill in the art. Therefore, all these modifications, equivalents, or variations fall within the protection scope of the claims appended.

What is claimed is:

1. A gateway for use in wireless communication, wherein the gateway comprising:
    a server communication unit; a node communication unit; and a control unit; wherein:
    the server communication unit for communicating with the server;
    the node communication unit for communicating with at least one node via a protocol having a LoRaWAN-based communication protocol, the node communication unit receives a data packet provided and encoded by the node, wherein the data packet includes data collected by the node,
    wherein the data packet has a LoRaWAN-based structure including a modified physical payload section and four information fields according to the LoRaWAN communicating protocol which are a preamble, a physical header, a physical header CRC, and a CRC inserted into the data packet automatically,
    wherein the physical payload section includes a medium access control layer header subsection and a medium access control layer payload subsection, characterized in that:
    the medium access control layer header subsection includes a message type information for indicating a type of a data packet,
    the medium access control layer payload subsection includes a frame header subfield, wherein the frame header subfield contains a device address information which includes a node address of the node that generates data packets and a gateway address of the gateway to which said node communicates, and a frame control information which includes an acknowledgement information and a portion for reserved for future usage for customizing a frame controlling;
    the control unit is configured for controlling the gateway to:
    only communicate with the server(s) and the nodes without communicate with other different gateways within a same network,
    receive a data packet sent from node if said data packet includes a gateway address information which is specified in the device address information above identical with a gateway address information of the gateway,
    generate and send an acknowledgement information to said node after the gateway has received said data packet,
    decode said data packet sent from said node for obtaining data collected by the node, and process said data at the gateway for obtaining a processed data, and
    send the processed data to the server via the server communication unit.

2. The gateway according to claim 1, wherein said data processing at the gateway includes, without a limitation of, data gathering, carrying out edge computing algorithms, carrying out AI (Artificial Intelligence) algorithms, or the same.

3. The gateway according to claim 1, wherein the server communication unit of the gateway communicates with the server via WiFi, Ethernet, 4G LTE, radio, wired communication, wireless communication, or any of their combination.

4. The gateway according to claim 1, wherein the message type information is 3 bits in length and indicates types of the data packet including a join-request message, a join-accept message, an unconfirmed data message, a confirmed data message, an unconfirmed command message, a confirmed command message, based on the values of the bits.

5. The gateway according to claim 1, wherein the device address information is 4 bytes in length, 2 bytes for indicating the node address and 2 bytes for indicating the gateway address.

6. The gateway according to claim 1, wherein the acknowledgement information is 1 bit in length.

* * * * *